United States Patent [19]
Kim

[11] Patent Number: 5,838,391
[45] Date of Patent: Nov. 17, 1998

[54] METHOD AND APPARATUS FOR DETECTING OPTIMUM MOTION VECTORS

[75] Inventor: Sang-Ho Kim, Seoul, Rep. of Korea

[73] Assignee: Daewoo Electronics Co. Ltd., Seoul, Rep. of Korea

[21] Appl. No.: 673,461

[22] Filed: Jul. 1, 1996

[30] Foreign Application Priority Data

Jun. 30, 1995 [KR] Rep. of Korea .................. 1995-19182

[51] Int. Cl.⁶ ..................................................... H04N 7/50
[52] U.S. Cl. ........................................... 348/699; 348/413
[58] Field of Search .................................. 348/699, 402, 348/413, 416; H04N 7/50

[56] References Cited

U.S. PATENT DOCUMENTS

| | | | |
|---|---|---|---|
| 5,355,378 | 10/1994 | Ohta | 348/699 |
| 5,461,421 | 10/1995 | Moon | 348/699 |
| 5,469,517 | 11/1995 | Ohta | 348/699 |
| 5,561,475 | 10/1996 | Jung | 348/699 |

*Primary Examiner*—Howard W. Britton
*Attorney, Agent, or Firm*—Anderson Kill & Olick P.C.

[57] ABSTRACT

The invention provides a method and apparatus for determining a motion vector between a current frame and its reference frame of video signals. A search block is motion-estimated with respect to its corresponding search region to thereby select a predetermined number of candidate blocks among the candidate blocks included in the corresponding search region, wherein the selected candidate blocks have error functions not larger than those of the unselected candidate blocks. Thereafter, error signals for each of the selected candidate blocks are obtained and transformed into a set of transform coefficients. Next, an optimum error signal is selected based on the sets of transform coefficients and, a displacement of pixels between the search block and a candidate block which corresponds to the optimum error signal is selected as a motion vector for the search block.

12 Claims, 3 Drawing Sheets

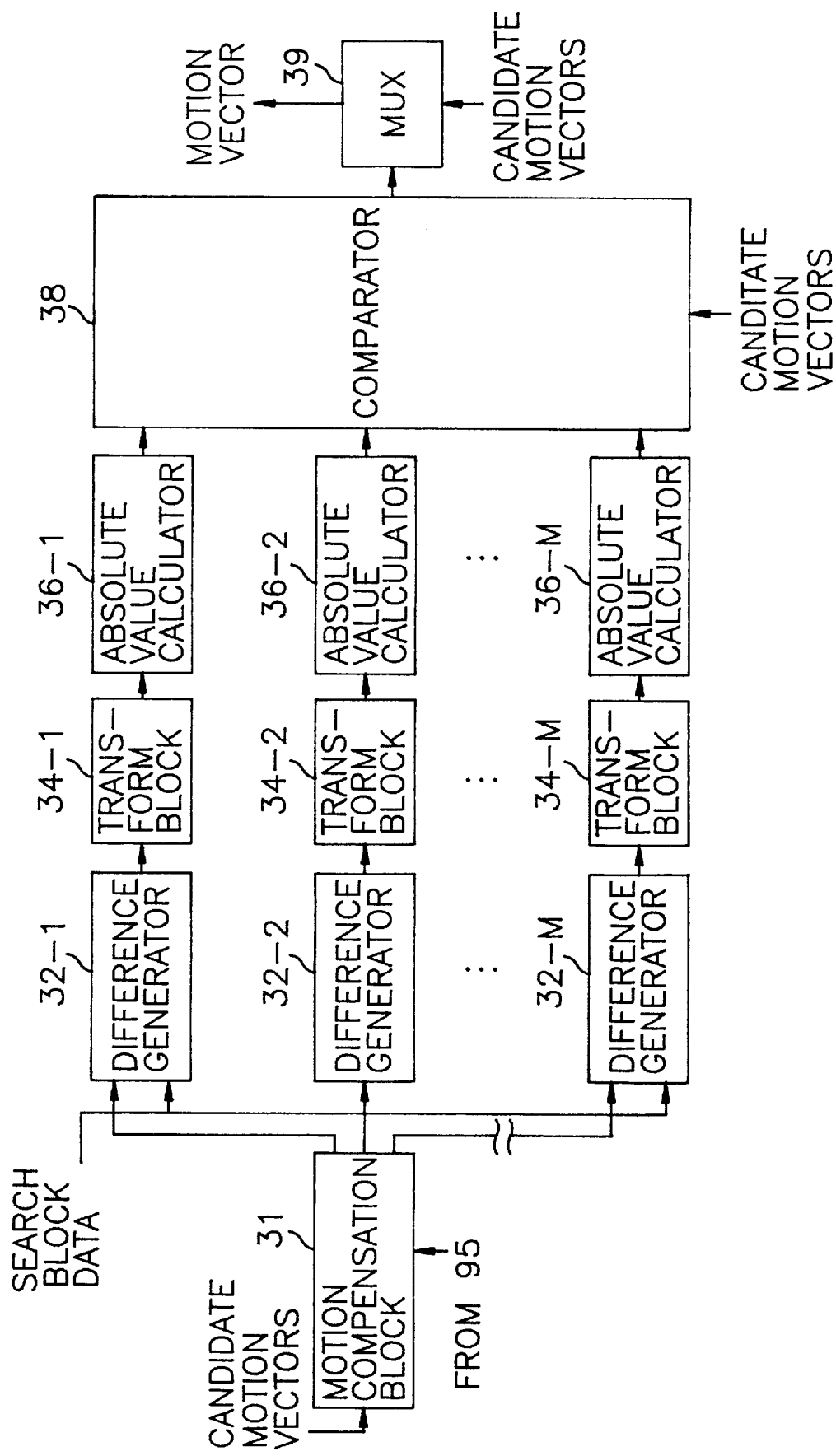

METHOD AND APPARATUS FOR DETECTING OPTIMUM MOTION VECTORS

FIELD OF THE INVENTION

The present invention relates to a method and apparatus for determining motion vectors; and, more particularly, to an improved method and apparatus for determining motion vectors through the use of temporal correlationship between the frames and spatial correlationship between pixels of a motion compensated block signal.

BACKGROUND OF THE INVENTION

Transmission of digitized video signals can deliver video images of much higher quality than the transmission of analog signals. When an image signal comprising a sequence of image "frame" is expressed in a digital form, a substantial amount of data is generated for transmission, especially in the case of a high definition television(HDTV) system. Since, however, the available frequency bandwidth of a conventional transmission channel is limited, in order to transmit the substantial amounts of digital data through the limited channel bandwidth, it is necessary to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its reference, e.g., previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of DCT coefficient data. This technic is described in Chen and Pratt, "Scene Adaptive Coder", IEEE Transactions on Communications, COM-32, NO.3, pp.225–231 (March 1984). By processing such DCT coefficient data with a quantizer, zigzag scanning,and VLC, the amounts of data to be transmitted can be effectively compressed.

Specifically, in the motion compensated DPCM, a current frame data is predicted from a reference frame data based on an estimation of the motion between the current and the previous frames, e.g., through the use of a block matching algorithm (see, e.g., J. R. Jain et al., "Displacement Measurement and Its Application in Interframe Image Coding", IEEE Transactions of Communications, COM-29, No.12, pp.1799–1808 (December 1981)). Such estimated motion may be described in terms of two dimensional motion vectors representing the displacement of pixels between the reference and the current frames.

According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a reference frame. An error function such as the mean absolute error or mean square error is used to carry out a similarity measurement between the search block of the current frame and each of the candidate blocks in the search region. And a motion vector, by definition, represents a displacement between the search block and a candidate block which yields a minimum error function.

Although such a minimum error reflects a maximized temporal cross-correlation between the search block and a candidate block which yields a motion vector, it may not optimize the spatial correlation between pixels of an error signal provided by the motion compensated DPCM.

SUMMARY OF THE INVENTION

It is, therefore, a primary object of the present invention to provide an improved method and apparatus for providing an optimum motion vector by employing a similarity measurement between a search block and each of the candidate blocks within a corresponding search region along with a spatial correlation measurement between pixel data in each of error signals generated from the search block and candidate blocks which are selected based on the similarity measurement.

A method for determining a motion vector between a current frame and its reference frame of video signals, wherein the current frame is divided into a plurality of search blocks of an identical size and the reference frame includes a corresponding number of search regions, each search region further including a multiplicity of candidate blocks of said identical size, which comprise the steps of:

motion-estimating a search block with respect to its corresponding search region to thereby select a multiple number of candidate blocks among the candidate blocks included in the corresponding search region, wherein said selected candidate blocks have error functions not larger than error functions of the unselected candidate blocks included in the corresponding search region;

generating error signals, each of which represents a difference of pixel data between the search block and each of the selected candidate blocks;

transforming each of the error signals into a set of transform coefficients, to thereby provide a multiple number of sets of transform coefficients;

selecting an optimum error signal based on the sets of transform coefficients provided in said step (c); and determining a motion vector for the search block, the motion vector representing a displacement of pixels between the search block and a candidate block which corresponds to said optimum error signal.

BRIEF DESCRIPTION OF THE DRAWING

The above and other objects and features of the present invention will become apparent from the following description of preferred embodiments given in conjunction with the accompanying drawings, in which;

FIG. 3 represents a block diagram of an optimum motion vector determinator shown in FIG. 1.

DETAILED DESCRIPTION OF THE PREFERRED EMBODIMENT

Figure 1:
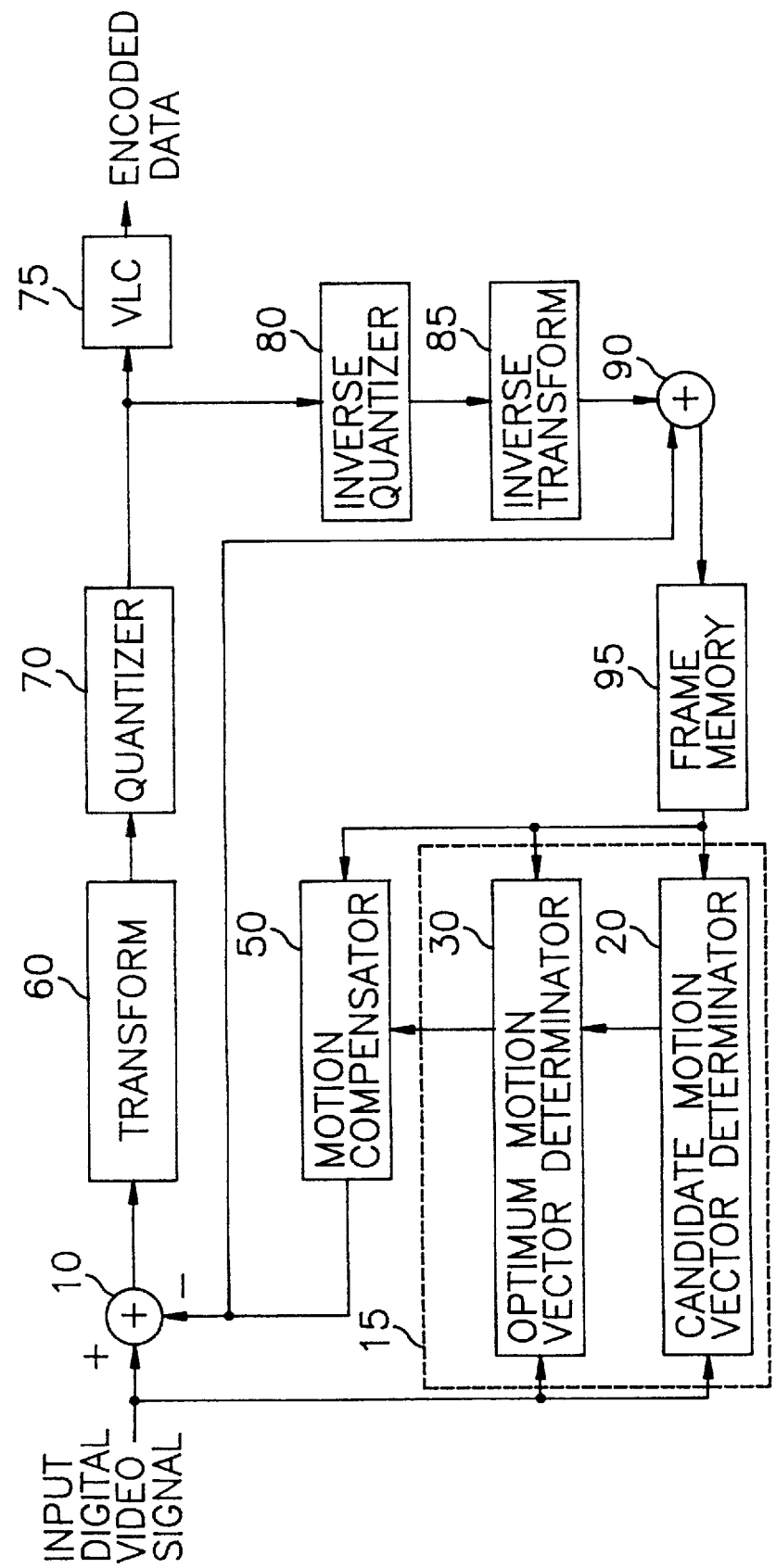
FIG. 1 illustrates a block diagram of an apparatus for compressing an input digital video signal in accordance with the invention.

Referring to the FIG. 1, there is shown a block diagram of an apparatus for compressing an input digital video signal, which comprises a motion estimator 15 of the present invention, wherein the motion estimator 15 includes a candidate motion vector determinator 20 and an optimum motion vector determinator 30.

A current frame of an input digital video signal is fed to the motion vector determinators 20 and 30 and a subtractor 10. Actually, the current frame video signal is stored in an input memory (not shown), wherein the current frame is divided into a plurality of search blocks, which are sequentially retrieved therefrom on a block-by-block basis, the size of a search block typically raging from 8×8 to 32×32 pixels. At the candidate motion vector determinator 20 of the present invention, a motion estimation is carried out, through the use of the conventional block matching algorithm, between a search block of the current frame and each of the candidate blocks within a corresponding search region of a reference, e.g., previous, frame provided from a frame memory 95. Outputs from the candidate motion vector determinator 20 to the optimum motion vector determinator 30 are a predetermined number of candidate motion vectors. The optimum motion vector determinator 30 selects one of the candidate motion vectors and provides as a motion vector of the search block, the selected optimum motion vector to a motion compensator Details of the motion vector determinators 20 and 30 will be described hereinafter with respect to FIGS. 2 and 3.

In response to the motion vector from the optimum motion vector determinator 30, a prediction signal, i.e., pixel data of the candidate block corresponding to the motion vector, is retrieved from the frame memory 95 and provided to the subtractor 10 and an adder 90 by the motion compensator 50.

The prediction signal from the motion compensator 50 is substrated from the search block of the input digital video signal at subtractor 10; and the resultant data, i.e., an error signal or a motion compensated block signal, is dispatched to a transform section 60. At transform section 60, thd error signal is encoded into a set of transform coefficients by using, e.g., the DCT(discrete cosine transform).

At a quantizer 70, the set of transform coefficients from the transform coder 60 are quantized into a set of quantized transform coefficients which is subsequently fed to a VLC coder 75 and an inverse quantizer 80. At the VLC coder 75, the data received from the quantizer 70 is converted into a set of variable length coded data. The set of quantized transform coefficients are converted back to a set of transform coefficients at the inverse quantizer 80. The set of transform coefficients is then applied to an inverse transform section 85 and transformed therein into a block of pixel data. At the adder 90, prediction signal, from the motion compensator 50 and the block of pixel data from inverse transform section 85 are summed to provide a reconstructed block signal of the search block to be written onto the frame memory 95. The frame memory 95 has two frame memory locations storing the current and the previous frame data. The output signal from the adder 90 comprises blocks of pixel data. When all of the blocks representing the current frame are stored in the frame memory 95, new frame data is provided from thd adder 90. At this moment, the new data is referred to as a current frame and the current frame data previously stored in the frame memory 95 is referred to as the previous frame. The encoded data from the VLC coder 75 is supplied to the transmitting end(not shown) for data transmission.

Figure 2:
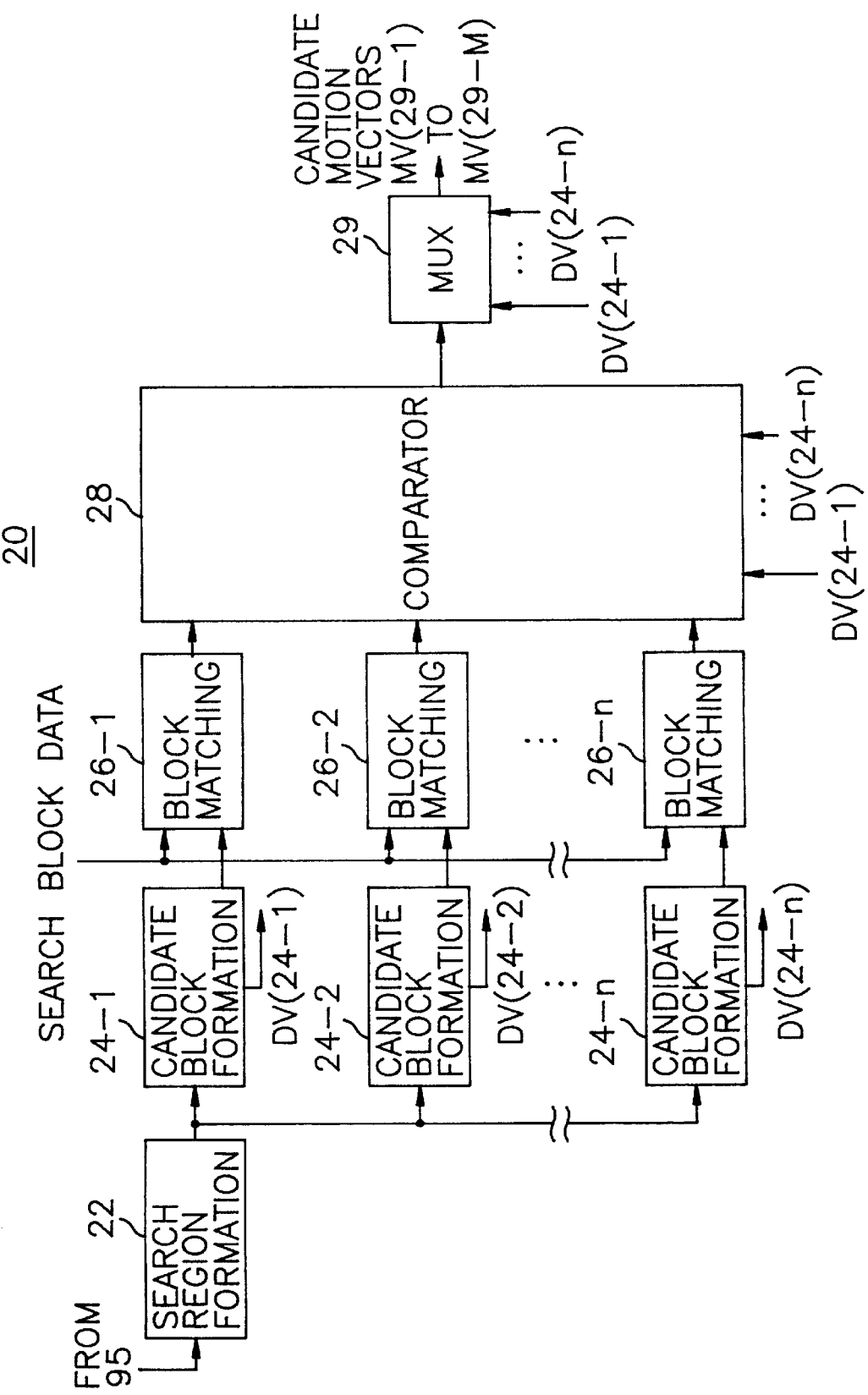
FIG. 2 depicts a block diagram of a candidate motion vector determinator shown in FIG. 1.

Referring to FIG. 2, there is shown a detailed block diagram of the candidate motion vector determinator 20 shown in FIG. 1. The previous frame signal stored in the frame memory 95 shown FIG. 1 is applied to a search region formation section 22. The search region formation section 22 defines a corresponding search region to the search block with a certain size, shape and search pattern, whereby the motion estimation of the search block is carried out. After the search region is determined at the search region formation section 22, the search region data is applied to candidate block formation sections 24-1 to 24-n. There may be a multiple number of candidate block formation sections; however, only 3 sections are depicted for the sake of simplicity. At each of candidate block formation sections 24-1 to 24-n, a candidate block of an identical size to that of the search block is generated within the search region; and pixel data of each candidate block is outputted therefrom to each of block matching sections 26-1 to 26-n. The relative displacements of the candidate blocks from the location of the search block of the current frame are also outputted from candidate block formation sections 24-1 to 24-n to a comparator 28 and a multiplexer 29 as displacement vectors DV (24-1) to (24-n), respectively.

At each of the block matching sections 26-1 to 26-n, an error function is calculated between the pixel data of the search block of the current frame and the pixel data of the candidate block from each of the candidate block formation sections 24-1 to 24-n, wherein the MSE(mean square error) or the MAE(mean absolute error) is calculated between corresponding pixels in the search block and the candidate block to yield the error function for that candidate block. The error function indicates the degree of similarity between the search block and the candidate block.

All the error functions from the block matching sections 26-1 to 26-n are applied to the comparator 28. The comparator 28 compares the error functions and selects therefrom M number of error functions, and outputs to the multiplexer 29 a first selection signals which indicates candidate blocks corresponding to the selected error functions, M being an integer larger than 1, wherein the seleted error functions includes a least error function and are selected in an ascending order of their magnitude. In case, there exist more than one error functions having an identical magnitude, the selection is carried out by considering their corresponding displacement vectors in accordance with the present invention, that is, if there are one error functions of the minimum magnitude and four error functions of a second minimum magnitude while M is 4, displacement vectors corresponding to the four error functions are compared each other and three error functions are selected out of four in an ascending order of their corresponding displacement vectors.

In response to the first selection signal, the multiplexer 29 then chooses each of the displacement vectors of the candidate blocks, which correspond to the selected error functions and sequentially provides, as candidate motion vectors MV(29-1) to MV(29-M) for the search block, the chosen displacement vectors to the optimum motion vector determinator 30 shown in FIG. 1.

Referring to FIG. 3, there is illustrated a detail block diagram of the optimum motion vector determinator 30 shown in FIG. 1. The candidate motion vectors MV(29-1) to MV(29-M) from the multiplexer 29 shown in FIG. 2 are fed to a motion compensation block 31, a comparator 38 and a multiplexer 39. The motion compensation block 31 retrieves, from the frame memory 95 shown in FIG. 1, the candidate blocks which correspond to the candidate motion vectors. The retrieved candidate block signals are fed to difference generator 32-1 to 32-M, respectively.

Meantime, the search block data of the input digital video signal is applied to the difference generators 32-1 to 32-M, simultaneously. At each of the difference generators, an error signal or a motion compensated block signal is calculated between the search block data and each candidate block signal from the motion compensation block 31 in a similar manner as in the subtractor 10 shown in FIG. 1

The error signals from the difference generators 32-1 to 32-M are applied to transform blocks 34-1 to 34-M, respectively. At each of the transform blocks, an error signal is converted into a set of transform coefficients by using, e.g., DCT in an identical fashion as in the transform section 60 shown in FIG. 1. The respective sets of transform coefficients from the transform blocks 34-1 to 34-M are then applied to absolute value calculators 36-1 to 36-M.

Each of the absolute value calculators calculates a sum of the absolute values of the transform coefficients in a set and provides the calculated sum of the absolute values for each set to a comparator 38.

The comparator 38 compares the sums from the absolutes value calculators 36-1 to 36-M and selects therefrom a sum of a least magnitude, thereby providing the multiplexer 39 with a second selection signal designating a candidate motion vector corresponding to the selected sum. If two or more sums have the least value, the comparator 38 compares magnitude of candidate motion vectors corresponding to the two ro more sums; and selects a sum corresponding to a candidate motion vector having a least magnitude.

The multiplexer 39 then chooses,as an optimum motion vector, a candidate motion vector of the candidate block, which corresponds to the sum of the least absolute value, thereby providing the optimum motion vector as the motion vector of the search block to the motion comparator 50 shown in FIG. 1.

While the present invention has been shown and described with respect to the particular embodiments, it will be apparent to those skilled in the art that many changes and modifications may be made without departing from the spirit and scope of the invention as defined in the appended claims.

What is claimed is:

1. A method for determining a motion vector between a current frame and its reference frame of video signals, wherein the current frame is divided into a plurality of search blocks of an identical size and the reference frame includes a corresponding number of search regions, each search region further including a multiplicity of candidate blocks of said identical size, which comprises the steps of:

(a) motion-estimating a search block with respect to its corresponding search region to thereby select a multiple number of candidate blocks among the candidate blocks included in the corresponding search region, wherein said selected candidate blocks have error functions not larger than error functions of the unselected candidate blocks included in the corresponding search region;

(b) generating error signals, each of which represents a difference of pixel data between the search block and each of the selected candidate blocks;

(c) transforming each of the error signals into a set of transform coefficients, to thereby provide a multiple number of sets of transform coefficients;

(d) selecting an optimum error signal based on the sets of transform coefficients provided in said step (c); and (e) determining a motion vector for the search block, the motion vector representing a displacement of pixels between the search block and a candidate block which corresponds to said optimum error signal.

2. The method according to claim 1, further comprising, after step(e), the step of:

(f) repeating said steps (a) to (e) with respect to each of the remaining search blocks within the current frame.

3. The method according to claim 1, wherein said step (d) includes the steps of:

(d1) calculating a sum of absolute values of the transform coefficients in each set;

(d2) selecting a sum of a least value; and (d3) choosing an error signal corresponding to the selected sum of the least value as the optimum error signal.

4. The method according to claim 3, wherein each of the error functions is a mean absolute error.

5. The method according to claim 3, wherein each of the error functions is a mean square error.

6. The method according to claim 3, wherein said step (a) includes the steps of:

(a1) motion estimating the search block with respect to its corresponding search region to thereby generate an error function and a displacement vector for each of the candidate blocks included in the corresponding search region, the displacement vector representing a displacement of pixels between the search block and said each of the candidate blocks; and (a2) selecting the multiple number of candidate blocks and providing displacement vectors for the selected candidate blocks as candidate motion vectors, none of the error functions for said selected candidate blocks being greater than an error function for any unselected candidate block within the corresponding search region.

7. The method according to claim 6, wherein the selected candidate blocks are determined such that if an error function for a selected candidate block equals to any one of the error functions for the unseleted candidate blocks, a magnitude of a displacement vector for said selected candidate block is not greater than that of said any one of the error functions.

8. The method according to claim 6, wherein said step (d2) includes the step of:

(d21) if only one sum has the least value, selecting said only one sum as the sum of the least value and if two or more sums have the least value, detecting a candidate motion vector of a minimum magnitude among candidate motion vectors corresponding to said two or more sums thereby select a sum corresponding to the detected candidate motion vector as the sum of the least value.

9. The method accoriding to claim 8, wherein said reference frame is a preceding frame of the current frame.

10. An apparatus for determining a motion vector between a current frame and its reference frame of video signals, wherein the current frame is divided into a plurality of search blocks of an identical size and the reference frame includes a corresponding number of search region, each search region further including a multiplicity of candidate blocks of said identical size, which comprising:

means for motion-estimating a search block with respect to its corresponding search region to thereby generate an error function and a displacement vector for each of the candidate blocks included in the corresponding search region, the displacement vector representing a displacement of pixels between the search block and said each of the candidate blocks;

means for generating a multiple number of candidate motion vectors based on the error functions, wherein the candidate motion vectors represent displacement vectors of candidate blocks which are selected such that none of the error functions thereof is greater than an error functions for any unselected candidate block;

means, responsive to the candidate motion vectors, for providing error signals of said multiple number, each of the error signals representing a difference of pixel data between the search block and each of the selected candidate blocks;

means for obtaining transform data consisting of a corresponding multiple number of sets of transform coefficients by transforming each of the error signals into a set of transform coefficients; and means for determining a motion vector for the search block based on the transform data.

11. The apparatus according to claim 10, wherein said means for determining the motion vector includes:

means for calculating a sum of absolute values of transform coefficients in each set included in the transform data to thereby provide a multiple number of sums;

means for detecting a sum of a minimum value among said multiple number of sums; and means, responsive to the candidate motion vectors, for selecting a candidate motion vector corresponding to said detected sum as the motion vector of the search block.

12. The apparatus according to claim 11, wherein said determining means includes:

means for finding one or more sums of the minimum value; and, in response to the candidate motion vectors, means, if only one sum of the minimum value is found, determining said only one sum as the detected sum and if more than one sum have the minimum value, comparing magnitudes of candidate motion vectors corresponding to said more than one sum and determining, as the detected sum, a sum corresponding to a candidate motion vector of a least magnitude.

* * * * *

UNITED STATES PATENT AND TRADEMARK OFFICE
CERTIFICATE OF CORRECTION

PATENT NO.     : 5,838,391
DATED          : November 17, 1998
INVENTOR(S)    : Sang-Ho Kim It is certified that error appears in the above-identified patent and that said Letters Patent is hereby corrected as shown below:

Title page, item
    [30]  Foreign Application Priority Data

Jun. 30, 1995  [KR]   Rep. of Korea         95-19182

Signed and Sealed this

Ninth Day of March, 1999

Attest:

Q. TODD DICKINSON

*Attesting Officer*    *Acting Commissioner of Patents and Trademarks*